July 15, 1941.  J. B. ORR, JR  2,249,723
WELDING NONCORROSIVE METAL MEMBER
Filed May 16, 1938
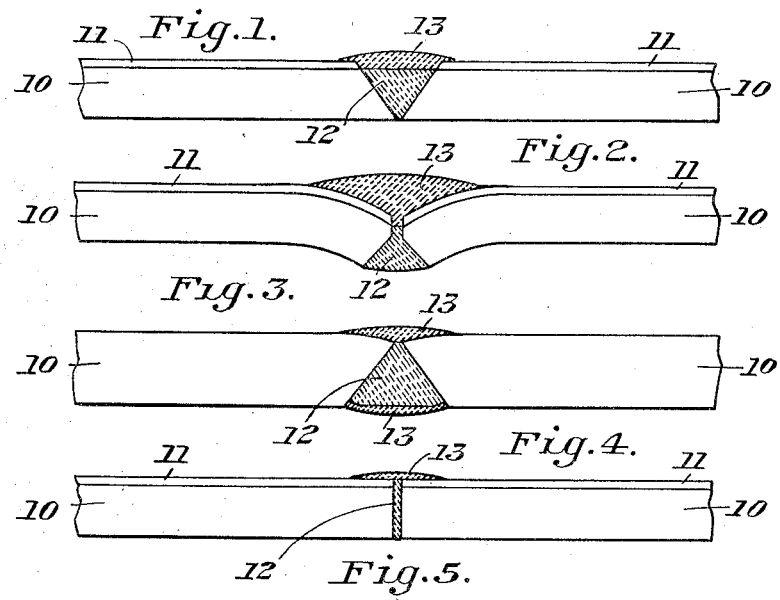
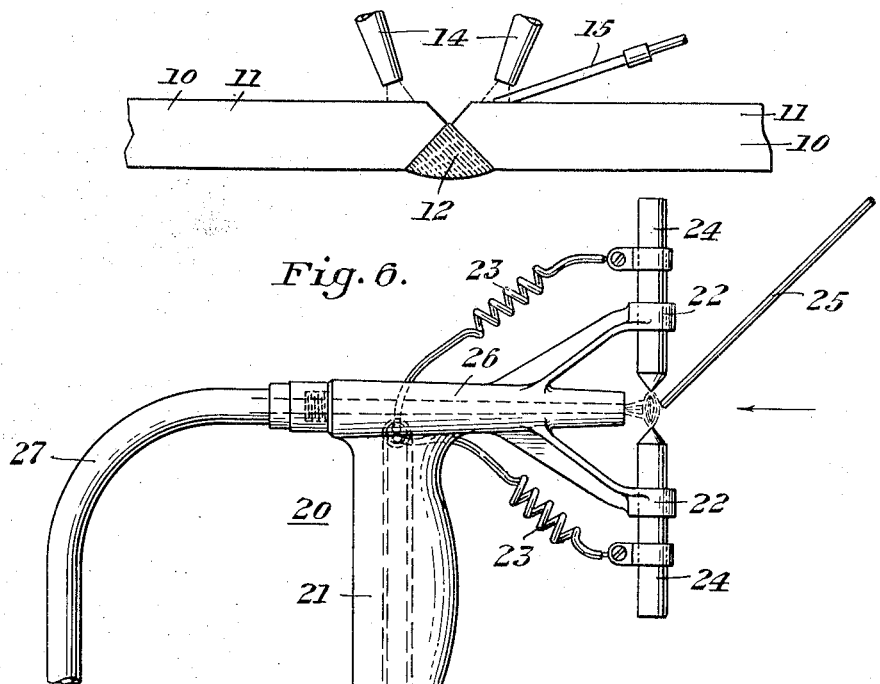
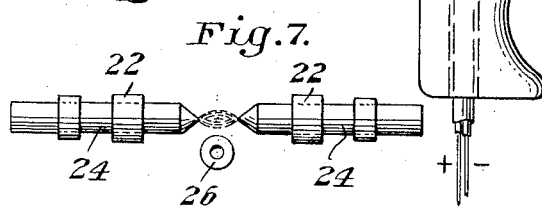
INVENTOR
John B. Orr, Jr.
By Thomas G. Miller
His attorney Patented July 15, 1941

2,249,723

UNITED STATES PATENT OFFICE 2,249,723

WELDING NONCORROSIVE METAL MEMBER

John B. Orr, Jr., Sewickley, Pa.

Application May 16, 1938, Serial No. 208,171

10 Claims. (Cl. 113—112)

This invention relates to uniting or welding together metal members, such as plates and sheets, and to the uniting or welding of stainless or corrosion-resisting metal members, and particularly, to the welding together of plied and/or clad stainless or corrosion-resisting metal members.

In one aspect, my invention has particular application to the welding together of metal members after they have been suitably worked into shapes and before or while they are being formed into suitable articles, such as tanks, containers, table tops, sinks, etc.

By employing the principles of the invention set forth in my copending applications Serial Nos. 117,509 and 82,160, I have been able to produce clad or plied metal members of a new percentage range of thickness or gauge. However, considerable difficulty has heretofore been encountered in after-welding together of solid, and especially, of plied stainless or noncorrosive steel members, and such difficulties tend to limit the employment of the new scale range or thickness ratios where after-welding is necessary.

It has heretofore been impossible from a practical standpoint to weld sheets clad with less than 30% stainless steel and lighter than 12 gauge and plates clad with less than 20% stainless steel. By carrying out the principles of the present invention, I have been able, to, without any difficulty, successfully weld together sheets and plates and other shapes of clad metal having as little as 5% stainless steel corrosion-resisting cladding.

I have found that satisfactory results were heretofore difficult to obtain for a number of reasons: in the first place, an important problem is caused by the heat generated by welding operations; in all hitherto known welding methods, it has been necessary to heat the materials to be welded to a welding or near welding temperature in order to obtain a satisfactory bond. In some instances, no weld metal is deposited, but of course the materials being joined together must be raised to a melting temperature. And, in general, it has always been necessary to heat the materials being welded to very high temperatures. When the juncture between two pieces of stainless material is heated to a welding temperature, the heat spreads out by conduction for some distance on each side of the juncture. Since heat is dissipated as it thus spreads outward, the temperature of the material at a point close to the juncture will be greater than the temperature at a point 2" away; in other words, there will be a heat gradient from the juncture.

Where stainless steel of the 18–8 type is heated to a temperature above 1200° F. and less than 1800° and allowed to cool, the carbon in solution in the material is precipitated and deposited in the grain boundaries; such precipitated carbon destroys corrosion-resisting qualities of the metal and thus makes it unsuitable for the use for which it was intended. Since the temperature of the material being welded must be close to its melting point during the welding operation or approximately 2800° F. at the juncture, there will be an area some distance from the welded juncture that will be raised to between 1200° and 1800° F.; as above explained, this is a critical range from the standpoint of the loss of corrosion-resisting properties.

The heat of the welding operation also tends to set up strains in the welded material due to expansion and contraction of the heated areas. Strains of this type tend not only to weaken the material, but also to make it subject to fatigue corrosion, a peculiar type of very damaging corrosion that is greatly increased in intensity where metal becomes subject to strains and stresses. Moreover, I have found that such strains tend to cause a reaction similar to carbon precipitation, explained above. Although the after-annealing of an article of solid stainless steel after the welding operation may correct some of the destructive actions, it is apparent that it is impractical and in many cases impossible to after-anneal welded articles because of their size, shape, etc.

The same destructive actions are even more effective where materials having stainless or noncorrosive steel cladding are to be welded. In addition, the intense heat of the welding operation tends to cause the carbon steel backing metal to alloy or mix with the stainless steel ply or surface. This action spoils the rust or corrosion-resisting properties of the stainless steel, and no amount of annealing or after-treatment will correct the condition. Such alloying action invariably takes place in the welding of stainless or noncorrosive steel clad material containing less than 20% of stainless or noncorrosive steel. I have further determined that the difficulties of welding increase in proportion to the decrease of percentage thickness of the stainless or noncorrosive steel layer or ply. As a result, it has heretofore been impossible from a practical standpoint to weld stainless or noncorrosive clad materials containing less than 20% stainless steel, or of a thickness less than ⅛", due particularly to the above-mentioned difficulties.

There are also other factors which should be taken into consideration in welding both solid and plied stainless or noncorrosive steel members: that is, it has heretofore been necessary to employ a stainless steel welding rod, and such a rod costs approximately ten times that of an ordinary welding rod. I have found that an ordinary welding operation also tends to spoil the corrosion-resisting properties of the welding rod, itself. Another factor is that stainless steel requires a much higher welding temperature than carbon steel, and rough and uneven weld areas result; and, expensive cutting and finishing operations are necessary to smooth them off. Then, too, I find it advisable to roughen and/or clean the adjacent areas of the members to be joined prior to the welding operation in order to obtain a good adherence; the roughing operation, particularly in the case of thin stainless steel members, may remove a substantial portion of the stainless layer or remove it down to the carbon steel layer. This, of course, constitutes a barrier if an ordinary welding operation is to be employed. I have also determined that where the juncture between two pieces of stainless plied metal is heated to a welding temperature, the stainless steel will be burned off and the carbon steel base metal will be exposed in such cases where the stainless layer is less than 20%.

In view of the above considerations, I have developed a new and improved procedure for welding or uniting stainless or noncorrosive plied steel members that is practical for plied members down to a substantially microscopic gauge or thickness, and that is also valuable as applied to heavier gauge plied thicknesses as well as to solid stainless members. I have been able to so control and/or carry out the procedure that weld areas will be as fully corrosion-resisting as the adjacent portions of the members joined. Thus, it will be seen that it has been an object of my invention to provide an improved process for meeting the difficulties enumerated.

Another object of my invention has been to extend the useful application of stainless and corrosive members, and particularly, of plied members such as sheets, plates, strips, etc.

Another object has been to devise a process of welding metal members together that will make possible the utilization of a wider range of stainless or noncorrosive plied or clad thicknesses.

A further object has been to provide an inexpensive, practical, and improved form of weld between metal members, and particularly, between members of the noncorrosive or stainless type.

A still further object has been to provide a procedure for welding noncorrosive members together that will provide a noncorrosive jointure and/or area adjacent the jointure.

These and many other objects of my invention will appear to those skilled in the art from the description thereof, the claims, and the drawing.

In the drawing:

Figures 1–5, inclusive, are side views in elevation of metal members welded in accordance with the principles of my invention;

Figure 5 also shows a detail of a step in a preferred welding procedure;

Figure 6 is a plan view of an apparatus for applying metal in accordance with the principles of my invention; and Figure 7 is an end view in elevation taken from the right of Figure 6 and showing a detail as to the relative relationship between electrodes and a fluid nozzle.

In carrying out my invention, I set out to devise a procedure by which noncorrosive portions of the members could be welded without spoiling their corrosive properties, or if spoiled, could be welded in such a manner as to cover up and protect the spoiled portions thereof.

I have been able to solve one phase of the above-mentioned problems by developing a method of welding stainless steel and stainless clad metal such that the exposed surfaces of the stainless or noncorrosive material are held above or below (preferably below) the temperature at which they lose their corrosion-resisting properties. I have also been able to cover up "spoiled" portions by corrosion-resisting metal applied in such a manner that its "resisting" properties are retained. In accordance with a preferred procedure, weld metal, although in a molten condition where deposited at the juncture, is deposited in such quantities and in such a manner that its heat is immediately dissipated before the material being welded can reach a destructive temperature. By destructive temperature, I have reference to a temperature value or range of from substantially 1200° to 1800° F. such as previously explained. As the weld metal is deposited, I preferably direct a blast of cooling fluid such as air against surface portions of the stainless side of the material in such a manner as to further insure proper temperature conditions. The cooling effect of a preferred process is such that molten weld metal can be deposited on a piece of paper without igniting or burning it. The weld metal, itself, although it is deposited while in a molten state, does not lose any of its corrosion-resisting properties because it is cooled very rapidly through the destructive temperature range and such destructive effects as carbon precipitation or alloying with the carbon steel backing metal are prevented. Further, a weld produced in accordance with my invention plies the weld metal in small broken-up quantities under pressure, and under the cooling action of a suitable medium. As a result, the formation of scale on the weld metal or the material adjacent the juncture is prevented, since at no time does the weld reach a scaling temperature. And, in general, the weld offers a smooth, clean and pleasing appearance, in contrast to the rough scaly appearance of an ordinary weld. A weld produced in accordance with my preferred procedure need not be ground or polished except where an exceptionally bright surface is desired.

To carry out a preferred procedure, I weld a pair of members adjacent one of their sides, and then weld them together adjacent their opposite sides. For example, in the case of carbon steel members having a stainless steel ply or coating, I prefer to first weld them together from the carbon steel sides thereof employing a carbon steel welding rod (this step may be accomplished by employing any suitable welding agency such as gas, electric arc, etc.; a stainless steel rod may be employed but is unnecessary. The members are then welded from the stainless steel sides thereof to complete the weld; I have found that an ordinary type of welding operation was not entirely satisfactory even where applied in this manner, due to the temperature conditions previously explained. However, I have been able to control the temperature conditions on the stainless steel side of a pair of plied members while the members are being welded from their carbon steel sides by employing a suitable cooling agency, see, for example, fluid nozzle 14 of Figure 5. In this connection, I employ any suitable cooling medium but prefer a gaseous medium such as air. A suitable temperature reading instrument, such as a thermometer 15, may be placed upon the stainless side adjacent the weld in order to enable the operator to provide the necessary amount of cooling action. I have determined that the noncorrosive properties of the stainless portions of a pair of members are not spoiled by a momentary high temperature provided they are immediately brought back to a temperature below 1200° F.

It will be apparent that the previously-mentioned precautions will be useless if the stainless steel side is subsequently welded in an ordinary manner, since the temperature will rise above 1200° F. I determined that a spray method of application, and particularly a spray method of molten metal application, could be utilized without heating the material above the danger point and thus spoling the corrosive-resistant properties thereof. I also found that stainless metal used in such a process can be heat-treated and be suitably sprayed without spoiling the corrosive-resistant properties thereof. Thus, my procedure not only insures the retention of the corrosive-resisting properties of the stainless portions of the members, but also insures the retention of the corrosion-resisting properties of the metal employed in the welding operation.

In accordance with my preferred procedure, I roughen the stainless steel side adjacent the edges which are to be joined; any suitable method such as shot, quartz, sand or metal grit blasting can be used; but, I prefer shot blasting. Shot blasting may leave minute portions of the shot on the metal surface, and because of electrolytic action, these portions tend to decrease the corrosive-resistant properties thereof; but, I have been able to cover over these portions by the weld metal and thus protect them.

I have found that during the carbon steel welding operation, the molten metal applied tends to penetrate up to the stainless steel layer and no further. Since stainless steel, for example, that of the ordinary 18–8 variety, has a greater coefficient of expansion than carbon steel, plied plates tend to bend or warp slightly in the heated area of the weld, see Figure 2, and as a result, the weld on the carbon steel side is raised and that on the stainless steel side is depressed. The stainless steel side will thus appear as a slight depression extending about ⅜" on each side of the weld with a crevice or crack extending along the bottom of the depression corresponding to the thickness of the stainless steel layer. The roughening step removes grease, oxides, and other undesirable substances in the area of the depression. I then spray stainless or noncorrosive metal on the stainless side of the members. I find that a better weld is obtained where the members have a heated temperature and preferably a temperature from 600° to 1200° F. To save heat, I preferably apply the stainless weld to the members at such a time as to utilize the heat imparted thereto by the previous welding operation upon the carbon steel side portions of the members.

In accordance with the spray process, metal in a molten state is fluid-blasted, preferably gas-blasted, upon the stainless steel surface weld area in such a manner that the particles are atomized and the individual globules are smashed against the weld area. The pressure employed may be about 50 pounds or more. The process may be modified by employing powdered metal and forcing it through a hose by air pressure where it comes in contact with concentric rings of welding gas flame or by vaporizing the metal and vacuum-applying it.

From the above description, it will be apparent that any apparatus may be used that will enable the weld metal to be deposited in the desired manner, provided the heating gas flame or electric arc does not come into too close proximity contact with the members being welded, and provided that the weld material can be properly cooled or controlled as to temperature, and a desired molecular adherence is obtained between the weld metal and the members.

In Figure 6 of the drawing, I have shown a preferred form of electric spray device 20. The device includes a handle portion 21, a pair of bifurcated electrode supports 22, suitable electrical conductors or conduits 23, carbon arc electrodes 24, a welding rod 25, a gas supply nozzle 26 and a hose 27. The rod 25 may be substituted in the brackets 22 in place of one or both of the elements 24, if desired.

In Figure 1, I have shown a pair of members having a carbon steel ply 10 of relatively heavy thickness and a stainless or noncorrosive ply 11 of relatively light thickness. This represents a modification of my preferred welding method in that carbon steel weld material 12 is applied to a V-shaped juncture from the stainless steel side of the members, and then the stainless steel weld portion 13 is applied thereto from the same side.

Figure 2 shows a preferred method and also illustrates deformation, under certain temperature conditions, caused by the difference in the coefficients of expansion and contraction of the carbon steel base 10 and stainless steel layer 11. The projecting portions of the weld can, of course, be smoothed or leveled off. The stainless metal layer 11 and weld 13 can be bathed with suitable acid such as nitric, sulphuric, or a mixture thereof, to remove surface dullness and to leave a smooth, exposed, bright-metal finish without the need of utilizing buffing and/or cutting tools.

In Figure 3, I have shown a carbon steel center-weld portion 12 and protective-weld-metal surface portions 13 as applied to solid stainless or noncorrosive steel members 11; the weld material used may be entirely of the material of 13, but I prefer to spray-apply the surface portions in either case.

In Figure 4, I have shown a method by which my invention may be applied to a butt-welding operation. Figure 5 diagrammatically shows cooling apparatus 14 and also illustrates another type of weld in which two members 10 or 11 or 10—11 are welded from opposite sides of the piece and are wedge-shaped to limit the penetration of the weld metal from one side thereof. If plied members are to be welded, I prefer to provide the shortest wedge or V-portion adjacent the stainless side.

In Figure 5, a suitable temperature reading device has been diagrammatically indicated by the numeral 15. I prefer to provide the cooling nozzles 14 with a quantity as well as a velocity control agency; for example, the quantity can be controlled by a valve or the speed of a blower, while the velocity can be controlled by a valve-throttled throat.

I have found that minute metal particles impinge against the roughened stainless steel and become securely bonded to it under the conditions herein outlined, and I have found that hydrogen absorption by the metal particles may be inhibited by providing a sufficient oxygen content for the flame and/or by coating the welding rod or mixing the welding powder with certain organic compounds, such as sizing, off grade flour, and coal tar derivatives. I prefer to limit the oxygen by controlling the type of gases delivered by the nozzle 26.

The spray operation is continued until the depression caused by welding and warping in the case of clad plates is entirely filled up and a smooth surface is obtained on the plied or stainless side of the weld. I have found that acid treatment of the sprayed side further increases the corrosion-resisting properties, since metal oxides are removed. I also contemplate controlling the extent of the roughing as well as the spray applications by employing suitable patterns and/or stencil tape along the edges of the members to be joined. The sprayed weld portions may be subjected to hammering and other suitable treatment, but I have found that they are unnecessary provided the conditions of the application previously explained are complied with.

It will be apparent to those skilled in the art that my process may be carried out with variations from the illustrated procedure, that a stainless steel welding rod may be used instead of a carbon steel welding rod, that the welding may be done from the stainless side of the clad plates or that the plates may be mechanically flash-welded without the use of a welding rod, or that any other conventional welding methods may be employed for at least initially securing the portions of the members together, and particularly carbon steel portions thereof. Many other modifications, additions, subtractions, and combinations thereof may be made in the present invention without departing from the spirit and scope thereof as indicated in the appended claims.

I claim:

1. In a method of metal uniting a pair of metal members having a carbon steel side and a stainless steel side, the step of placing the members with the portions thereof to be welded in a juncture relationship with respect to each other, the members of the pair being placed with their carbon steel sides facing on the same side of the pair and their stainless steel sides on an opposite side of the pair, welding juncture portions of the pair together from the carbon steel side with carbon steel weld metal while permitting the carbon steel weld metal to flow up to the stainless steel side of the pair, and impact applying minute globules of molten noncorrosive weld metal upon the juncture portions of the pair from the noncorrosive sides thereof to at least substantially the thickness of the noncorrosive layer thereof, the above-mentioned steps being accomplished while maintaining the temperature of the stainless steel sides and the noncorrosive weld metal at temperature values inhibiting loss of their corrosion-resisting properties.

2. In a method as set forth in claim 1, the steps of roughing the stainless steel side of the pair of adjacent juncture portions thereof before applying the molten noncorrosive weld metal, and limiting the area of noncorrosive weld metal application by covering portions of the noncorrosive side of the pair adjacent the juncture.

3. In a method of uniting a pair of metal members having at least one noncorrosively plied side without causing a loss of the corrosion-resisting properties of such side and in such a manner as to provide a weld having desired corrosion-resisting properties, the steps of placing the members with their noncorrosive sides in adjacent relationship and with portions thereof to be welded in a juncture relationship with respect to each other, welding the juncture portions of the members together by a hot welding operation while maintaining the temperature of the noncorrosive sides of the members at a value inhibiting loss of corrosion-resisting properties thereof, applying a noncorrosive weld metal to juncture portions from the noncorrosive sides thereof in a finely divided state under pressure to weld such juncture portions together, said applications being accomplished in such a manner that the corrosion-resisting properties of the weld metal as well as those of the juncture portions of the noncorrosive sides of the members will be preserved.

4. In a method as defined in claim 3 wherein the finely divided metal is applied in a molten state.

5. In a method as defined in claim 3 wherein the finely divided metal is applied in a molten state by a non-oxidizing gaseous agency.

6. In a method as defined in claim 3 wherein the noncorrosive weld metal is applied to the members while they are still hot from the first-mentioned welding step.

7. In a method as defined in claim 3, the step of acid-treating the noncorrosive portion of the weld for improving its surface finish and corrosion-resisting properties.

8. In a method as defined in claim 3, the step of roughing the noncorrosive sides of the pair adjacent juncture portions thereof before applying the noncorrosive weld metal.

9. In a method of joining a pair of metal members having at least one noncorrosive steel side plied to a carbon steel portion without spoiling the corrosion-resisting properties of said noncorrosive side, the steps of welding the carbon steel portions of the members together by a heat application method, and welding the noncorrosive portions of the members together by a molten metal spray of noncorrosive weld metal, the whole being accomplished while maintaining the noncorrosive portions beyond a critical temperature range of substantially 1200–1800° F.

10. In a method as defined in claim 9, the steps of applying a cooling medium to the pair of members to maintain the desired temperature of the noncorrosive portions thereof and regulating the quantity and velocity of the cooling medium application in accordance with the temperature of the noncorrosive side of the pair.

JOHN B. ORR, JR.